United States Patent
Cabillic et al.

(10) Patent No.: US 11,983,516 B2
(45) Date of Patent: May 14, 2024

(54) METHOD FOR EXECUTING CODE PORTIONS ON EXECUTION RESOURCES

(71) Applicant: SCALEDYNAMICS, Cesson-Sévigné (FR)

(72) Inventors: Gilbert Cabillic, Brece (FR); Jean-Philippe Lesot, Argentré-du-plessis (FR)

(73) Assignee: SCALEDYNAMICS, Cesson-Sevigne (FR)

( * ) Notice: Subject to any disclaimer, the term of this patent is extended or adjusted under 35 U.S.C. 154(b) by 456 days.

(21) Appl. No.: 17/290,512

(22) PCT Filed: Oct. 25, 2019

(86) PCT No.: PCT/EP2019/079179
§ 371 (c)(1),
(2) Date: Apr. 30, 2021

(87) PCT Pub. No.: WO2020/089076
PCT Pub. Date: May 7, 2020

(65) Prior Publication Data
US 2021/0373863 A1    Dec. 2, 2021

(30) Foreign Application Priority Data
Oct. 31, 2018  (FR) ...................... 1860069

(51) Int. Cl.
*G06F 8/40* (2018.01)
*G06F 8/41* (2018.01)
*G06F 16/22* (2019.01)

(52) U.S. Cl.
CPC .......... *G06F 8/443* (2013.01); *G06F 16/2282* (2019.01)

(58) Field of Classification Search
CPC .. G06F 16/2282; G06F 8/443; G06F 9/45516; G06F 9/455
See application file for complete search history.

(56) References Cited

U.S. PATENT DOCUMENTS

| | | | | |
|---|---|---|---|---|
| 7,665,079 B1 * | 2/2010 | Yasue | ................. | G06F 9/45516 717/148 |
| 8,065,665 B1 * | 11/2011 | Kosche | ................... | G06F 8/443 717/154 |
| 2019/0340012 A1 * | 11/2019 | Granito | ................. | G06F 9/5011 |

OTHER PUBLICATIONS

International Search Report dated Feb. 6, 2020 for corresponding International Application No. PCT/EP2019/079179, dated Oct. 25, 2019.

(Continued)

*Primary Examiner* — Hanh Thi-Minh Bui
(74) *Attorney, Agent, or Firm* — David D. Brush; Westman, Champlin & Koehler, P.A.

(57) ABSTRACT

A method for executing a script code of an application, the method being implemented via an electronic device, called a calling resource, within which the application is executable. The method includes: obtaining the script code having a set of projectable objects, a projectable object having at least one function executable at a destination execution resource; preparing a transmission data structure of at least one projectable object obtained beforehand, the transmission data structure associating at least one indexing data to each projectable object of the script code; transmitting, to the destination execution resource, the transmission data structure; and subsequently to execution, by the destination execution resource, of at least one function of the at least one projectable object of the transmission data structure: receiving a data structure of execution results of the at least one function; and integrating execution results of the execution results data structure within the calling resource.

8 Claims, 4 Drawing Sheets

(56) References Cited

OTHER PUBLICATIONS

Written Opinion of the International Searching Authority dated Feb. 13, 2020 for corresponding International Application No. PCT/EP2019/079179, filed Oct. 25, 2019.

Anonymous. "javascript—WebWorkers and Asynchronous shared data access. How in Scala.js?—Stack Overflow" May 22, 2018 (May 22, 2018), Retrieved from the Internet: http://web.archive.org/web/20180522041746/https://stackoverflow.com/questions/49951842/webworkers-and-asynchronous-shared-data-access-how-in-scala-js [retrieved on Jul. 3, 2019] XP055601842.

\* cited by examiner

METHOD FOR EXECUTING CODE PORTIONS ON EXECUTION RESOURCES

CROSS-REFERENCE TO RELATED APPLICATIONS

This Application is a Section 371 National Stage Application of International Application No. PCT/EP2019/079179, filed Oct. 25, 2019, which is incorporated by reference in its entirety and published as WO 2020/089076 A1 on May 7, 2020, not in English.

1. FIELD

The invention relates to the field of computer code processing. More particularly, the invention relates to processing so-called script codes. This consists of a code that is interpretable and/or executable via a virtual machine or an interpreter. More specifically yet, the field of the invention is that of optimisation of script code execution within a dynamic execution environment.

2. PRIOR ART

It is common, in particular in an institutional context or in enterprises, to have complex computer systems architectures, involving the implementation of numerous devices (computers, servers, mobile devices), interconnected by one or several communication networks. Within such organisations, the number of devices that are connected to one another is growing steadily and maintenance of these hardware and software architectures is expensive. In an attempt to save on these costs, enterprises also resort to so-called "cloud" services, for example in order to implement SaaS (standing for "Software as a Service") or AaaS (standing for "Application as a Service") type solutions. Although they actually allow limiting maintenance costs related to directly-owned architectures, these solutions are not devoid of other constraints (in particular pertaining to data security or to performance).

As regards performance, regardless of the solution that is retained by the organisation, this is often assessed with regards to the expectations of the users. When the organisation possesses its infrastructure, the need for performance, in particular for the execution of server or client-server applications, requires the purchase of increasingly powerful hardware, fitted with more and more resources (processors, memory space, rapid disks), in order to address the needs encountered by the users.

Yet, although some applications or some programs are actually capable of fully using the resources made available by the new hardware, others are often unable to do so. Indeed, programs and applications may be divided into two main categories (later on we talk only about programs). The first is that one relating to compiled programs; these are programs whose source code (written for example in the C, C #, C++, Pascal language, etc.) is transformed, using one or several compiler(s) and/or one or several optimiser(s) into an executable code for a determined platform (a platform being understood as a processor architecture and/or an operating system). These compiled programs are effective as they are capable of taking advantage of all of the resources provided by the platform on which they are executed. This effectiveness finds its origin in the numerous published works allowing optimising a binary code according to the destination platforms (for example use of all of the processor cores that are available, parallelisation, common use of the memory, etc.).

The second category is that one relating to interpreted programs; these are programs whose source code is interpreted before being executed. Among the popular programming languages of this type, mention may be made for example of PHP, JavaScript, or bytecode Java. In the context of the invention, the term script code is used to refer to the code of a program written in a language of this type. The advantage of programs that are written in these languages is that they are multi-platform: the script code of the program is executed in the same way on different platform types. Only the interpreter is optimised for a determined platform. This considerably facilitates the spread of programs. However, the performances of this program type are often inferior to those of binary programs, even when carrying out a dynamic compilation. And the reason is that, although numerous works have been conducted to improve the operation of interpreters and virtual machines, these have not always led to fully satisfactory results.

For example, the JavaScript language allows writing programs (scripts) that are executed by a JavaScript engine (or JavaScript interpreter). Such an engine is either embedded within a Web navigator (Firefox™, Chrome™, Edge™, Opera™), or implemented separately within a dedicated interpreter (for example Node.js™). As is the case with other languages, the JavaScript code is historically a language that is executed in a mono-thread environment (that is to say all events are performed one after another). When a long function is implemented by the interpreter, the latter is not necessarily available to perform other tasks as long as the function is not completed. Of course, with the recent evolutions embedded within the interpreters, it is possible to create isolated execution streams via available interfaces (for example the "webworkers" in the navigators) or in Node.js (webworkers, child.spawn/fork). Thus, theoretically, there are solutions to carry out a remote function call within an execution stream different from the main stream. However, the main problem lies in the scope of the code executed in another execution stream. Indeed, to be able to operate properly, these existing solutions, such as those mentioned before, shall be embedded within the script source code during writing thereof by the developer. For example, the webworker call shall be provided in advance by the developer of the program who must therefore know, well ahead, that the program is likely to be executed over a long period and that it is therefore necessary to provide for one or several execution stream(s) for the execution of the program. Each execution stream (each webworker) implements a code that is specific thereto (and defined by a particular JavaScript file). Hence, there is no dynamism in the creation of a webworker, and even less dynamic load distribution. Moreover, the execution streams are independent of each other. This means that these do not allow managing the correspondence of the objects between the caller and the called because the existing solutions perform objects replications (when they do so), and neither do they allow managing the entire extent of applicability of the variables and functions within the different execution streams.

Hence, there is a need to provide a solution that does not pose the aforementioned problems and which allows taking advantage of more available resources within the information processing infrastructures.

3. SUMMARY

The method suggested by the inventors does not pose these problems of the prior art. Indeed, a method is provided for executing a script code of an application, the method implemented via an electronic device, called calling resource (ResA, A), within which said application is executable. According to the invention, such a method comprises:

a step of obtaining (20) the script code of the application (PCP) comprising a set of projectable objects, a projectable object of the set of projectable objects comprising at least one function executable at a destination execution resource (resX, B);

a step of preparing a transmission data structure (PCP #, heap) of at least one projectable object of said script code obtained beforehand, said transmission data structure associating to each projectable object of the script code, at least one indexing data;

a step of transmitting (40), to a destination execution resource, the transmission data structure (PCP #, heap) of the script code; and subsequently to the execution (50), by the destination execution resource, of at least one function of said at least one projectable object, the transmission data structure; a step of receiving (60) a data structure (ExObj, diff) of execution results of said at least one function;

a step of integrating execution results of the execution results data structure within a calling resource.

Thus, the invention enables the execution of a script source code on multiple resources without requiring, on the remote resources (destination execution resources), the implementation of a process that is different from that one usually implemented for the execution of a script code by one of these destination execution resources. Thus, in at least one embodiment, the invention allows performing a script code execution "distributed" over several execution resources. The transmission of the entire script code to the destination resource is no longer relevant. All it needs is to transmit a portion that is independent and executable in a standalone manner to implement the described technique, which simplifies the distribution of the treatments. Moreover, the transmission data structure associates to each projectable object of the script code, an indexing data, which shall be understood as an indexing data of the projectable object. In particular, the preparation of the transmission data structure comprises indexing the transmitted objects.

According to a particular feature, the step of integrating execution results of the execution results data structure within the calling resource comprises a differential verification of the integrity of the data updated during the execution (50), by the destination execution resource.

Thus, it is possible, within the calling resource, to ensure that the remote execution results do not conflict with other (local or destination) resources that might have modified the same data prior to the reception of these modified data by the destination execution resource. Hence, propagating or integrating inconsistencies in the processed data, when these are at least partially processed remotely, is avoided.

According to a particular feature, the step of obtaining the script code comprising a set of projectable objects comprises:

a step of obtaining (10) a script source code (CSSE), representative of the application to be executed by the calling resource (ResA, A);

a step of determining, within the script source code (CSSE), at least one function prone to be executed by a destination execution resource, called projectable function;

a step of modifying the script source code, delivering an execution script code comprising said set of projectable objects, according to said at least one projectable function determined beforehand.

Thus, the script source code is not directly transmitted to the resources to be executed. Instead, it is analysed so as to determine which code portions are prone to be projected towards destination execution resources, possibly by modifying the script source code itself.

According to a particular embodiment, the step of preparing a transmission data structure of at least one projectable object of said script code comprises:

a step of creating an indexing table ($ref_A$), for each projectable object (OA, XA) to be transmitted to a destination execution resource (ResX, B), within which table an index (0, 1, ...) is associated to an object reference (RefOA, RefXA, ...);

a step of creating the transmission data structure (PCP, heap) in the form of a table comprising, for each projectable object, an index (0, 1, ...), corresponding to the index (0, 1, ...) of the reference of this projectable object within the indexing table ($ref_A$) and a serialised representation (r0, r1, ...) of the projectable object.

Thus, by using two different data structures, on the calling resource side, to index the execution script code that is transmitted, it is ensured that it is possible, once the code executed by the destination resource is completed, to find back an object correspondence that is identical to that one which has been transmitted, and therefore a verification of the data received from the destination execution resource is made possible.

According to a particular embodiment, the step of receiving a data structure (ExObj, diff) of execution results of said at least one function comprises:

a step of receiving the transmission data structure (PCP #, heap) transmitted beforehand, in the form of a table comprising, for each projectable object, an index (0, 1, 2, ...), corresponding to the index (0, 1, 2, ...) of the reference of this projectable object within an indexing table ($ref_B$) of the destination execution resource (ResX, B), and a serialised representation (r0, r1, r2, ...) of the projectable object;

a step of receiving the execution results data structure (ExObj, diff) in the form of a table comprising, for each projectable object of the transmission data structure (PCP, heap) transmitted beforehand, an index (0, 1, 2, ...) and a serialised representation (r'0, r'1, ...) of the modifications performed by said at least one function executed by the destination execution resource (ResX, B).

Thus, it is possible to track the evolution (the modifications) made on the data, independently of the structuration of the transmitted data, while preserving the indexing performed at the input of the process during the creation of the data intended for the destination execution resource.

According to a particular feature, the step of integrating execution results of the execution results data structure (ExObj, diff) within the calling resource comprises:

a step of updating, within the calling resource (ResA, A), a list of objects, the update comprising a creation of a new object when an object absent from the transmission data structure has been created by the destination execution resource during the execution (50);

a step of updating the values of the objects of the objects list, comprising a verification of the consistency of the values to be updated according to the original values contained in the transmission data structure.

Thus, it becomes possible to check the preservation of the semantics, both on the code as well as the data that are transmitted and sent back by the destination execution resource.

According to a particular feature, the step of modifying the script source code, delivering an execution script code comprising said set of projectable objects, according to said at least one projectable function determined beforehand comprises:
- a step of determining at least one execution context of said application, according to the script source code (CSSE), said execution context of said application comprising, for each variable and/or object of the script source code (CSSE), a representation of a corresponding variable and/or object, accessible and/or modifiable during the projection towards a destination execution resource, said execution context taking into account the scope of each variable and/or object of the script source code (CSSE);
- a step of building the script code (PCP) according to the script source code (CSSE) and to said execution context determined beforehand.

Thus, it is ensured that the code projected towards the destination execution resource can be executed with a context identical to that one of the local resource. In fine, this allows ensuring a more effective operation of the projected codes, by minimising possible execution invalidation operations.

It should be understood, in the context of the description of the present technique according to the invention, that a step of transmitting a piece of information and/or a message from a first device to a second device, corresponds, at least partially, for this second device to a step of receiving the transmitted information and/or message, whether this reception and this transmission are direct or performed via other transport, gateway or intermediation devices, including the devices described hereby according to the invention.

According to another aspect, the invention also relates to an electronic device for executing a script code, called calling resource. Such a device comprises:
- means for obtaining the script code comprising a set of projectable objects, a projectable object of the set of projectable objects comprising at least one function executable at a destination execution resource;
- means for preparing a transmission data structure of at least one projectable object of said script code obtained beforehand, said transmission data structure associating to each object of the script code, at least one indexing data;
- means for transmitting to a destination execution resource, the transmission data structure of the script code; and
- means for receiving an execution results data structure, implemented subsequently to the execution, by the destination execution resource, of the transmission data structure;
- means for integrating execution results of the execution results data structure.

According to a complementary aspect, the invention also relates to a system for executing a script code. Such a system comprises at least one calling resource in the form of an execution electronic device as described at at least one remote resource, in the form of a script code execution resource accessible from the calling resource.

According to a preferred implementation, the different steps of the methods according to the invention are implemented by one or several computer software or programs, comprising software instructions intended to be executed by a data processor of an execution device according to the invention and being designed so as to control the execution of the different steps of the methods, implemented at the communication terminal, the execution electronic device and/or the remote server, in the context of a distribution of the treatments to be performed and determined by a script source code.

Consequently, the invention also covers programs, prone to be executed by a computer or by a data processor, these programs including instructions for controlling the execution of the steps of the methods as mentioned hereinabove.

A program may use any programming language, and be in the form of a source code, object code, or an intermediate code between a source code and an object code, such as in a partially compiled form, or in any other desired form.

The invention also covers an information medium readable by a data processor, and including instructions of a program as mentioned hereinabove.

The information medium may consist of any entity or device capable of storing the program. For example, the medium may include a storage means, such as a ROM, for example a CD ROM or a ROM of a microelectronic circuit, or a magnetic recording means, for example a mobile medium (memory card) or hard disk or a SSD.

Besides, the information medium may consist of a transmittable medium such as an electric or optical signal, which may be conveyed via an electrical or optical cable, by radio or by other means. In particular, the program according to the invention may be downloaded on an Internet-type network.

Alternatively, the information medium may consist of an integrated circuit within which the program is embedded, the circuit being adapted to execute or to be used in the execution of the considered method.

According to one embodiment, the invention is implemented by means of software and/or hardware components. In this respect, the term "module" may correspond in this document to a software component as well as a hardware component or to a set of hardware and software components.

A software component corresponds to one or several computer program(s), one or several subprogram(s) of a program, or more generally to any element of a program or software adapted to implement a function or a set of functions, according to what is described hereinbelow for the considered module. Such a software component is executed by a data processor of a physical entity (terminal, server, gateway, set-top-box, router, etc.) and is prone to access the hardware resources of this physical entity (memories, record mediums, communication buses, in/out electronic boards, user interfaces, etc.).

Similarly, a hardware component corresponds to any element of a hardware set adapted to implement a function or a set of functions, according to what is described hereinbefore for the considered module. This may consist of a hardware component that is programmable or with an embedded processor for the execution of software, for example an integrated circuit, a chip card, a memory card, an electronic card for the execution of a firmware, etc.

Of course, each component of the previously-described system implements its own software modules.

The different embodiments mentioned hereinabove can be combined together for the implementation of the invention.

4. FIGURES

Other features and advantages of the invention will appear more clearly upon reading the following description of a preferred embodiment, provided merely as an illustrative and non-limiting example, and from the appended drawings, among which.

5. DESCRIPTION

5.1. Disclosure of the Technical Principles

As indicated before, an object of the invention is to enable an effective use of execution resources available within an infrastructure, in the context of execution of script programs by an interpreter or a virtual machine. More particularly, the invention enables the execution, remotely or locally, in a plurality of execution streams (an execution stream belonging to the group comprising a processor thread, a processor, a processor core, a script language thread, an execution context of an instructions sequence), of one or several portions of applications. Thus, the invention enables a dynamic integration of execution resources (servers, personal computers, smartphones and tablets) and the dynamic allocation of portions of applications to the newly integrated execution resources.

The invention provides a simple and effective solution to the aforementioned problems. In particular, in the context of a one-server environment, the invention offers the possibility to automatically use all resources available within this server (using all of the cores of the available processors). In turn, the identification of the code portions to be distributed is either automatic, or manual. In the context of a multi-server use, the invention allows distributing codes portions executable between several servers in order to implement the execution resources available within these servers. Third, the invention also allows distributing codes portions executable over different devices (personal computers, tablets, smartphones) connected via one or several communication network(s).

Figure 1:
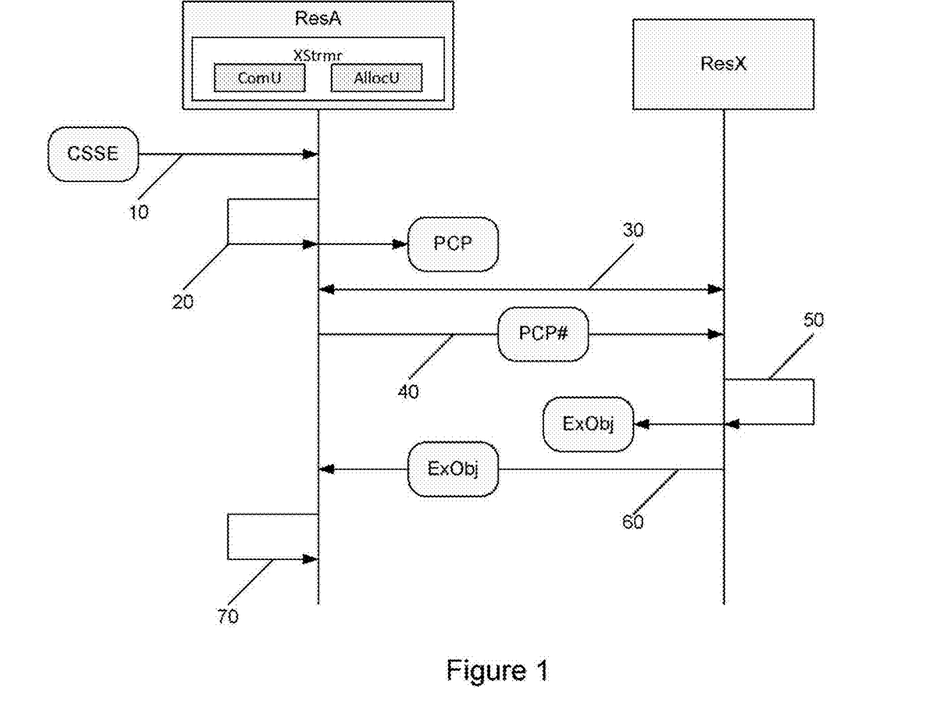
FIG. 1 describes a system in which the invention is implemented.

For this purpose, the invention is based on the implementation of a specific software module, which is used in a supervised mode or in a peer-to-peer mode. In the embodiment described later on, the supervised mode is detailed. Referring to FIG. 1, a general implementation of a script code processing implementing the technique of the invention is described. The specific software module (XStrmr), which is executed on a calling resource (ResA), comprises a compilation unit (ComU) and an allocation unit (AllocU).

This software module (XStrmr):

Gets (10) as input a script source code to be executed (CSSE);

Analyses (20) the script source code to be executed (CSSE) and searches and/or builds projectable code portions (PCP) which may undergo a projection to a destination execution resource (ResX) (a separate device or a specific core of a multi-core execution device); these first two steps being implemented by the compilation unit (ComU)

Identifies (30) one or several execution resources (ResX) able to execute the projectable code portions (PCP);

Once the codes portions and the available resources are identified (and/or built), it projects (40) these projectable code portions (PCP), towards one or several execution resource(s) (ResX) identified beforehand;

The identified resources themselves implement a plurality of the previously-described functions, and therefore at least one portion of the described software module (XStrmr), or the entirety thereof;

The execution resources (ResX) execute (50) the projected code portions (PCP);

The execution results (ExObj) of these codes portions (PCP) by the available resources are transmitted (60) to the calling software module (XStrmr);

The calling software module (XStrmr) processes (70) the received results.

These last five steps are implemented by the allocation unit (AllocU).

The execution streams are initialised before the transmission of the projectable code portions. This means that when a projectable code portion is transmitted, an execution stream able to execute this projectable code has already been initialised.

Thus, in general, the calling resource is capable of decomposing and/or modifying (whether automatically or not) the original application, into portions (pieces) that are executable independently of each other, and is then capable of transmitting these portions (and their execution context) to an identified resource, which executes this portion, using the transmitted context, and sends back the result to the calling resource for processing. More particularly, according to the invention, an execution streams management method is implemented in particular, the method comprising a process for saving the code portion (before transmission thereof to the destination resource) and a process for managing the scopes (of the variables in particular, also called scopes management process) and that being done in order to ensure consistency of execution of the code in the destination resource. These two processes allow certifying that the codes portions executed by the remote resource preserve the semantics, on the code as well as the data (and therefore they provide a result that is identical to that one which would have been obtained if these portions have been executed by the calling resource).

More specifically, the execution streams management method is implemented, within the aforementioned software module, using the compilation units and the allocation units. This execution streams management method allows preserving, in the different streams created for the projection of the code portions, a unified execution repository, which is used to ensure unicity of the execution. In other words, according to the invention, the execution of the different projected codes portions in the parallelised execution streams is transparent for the application. The latter is not aware that it undergoes a decomposition into several portions executed independently of each other by different resources, within different execution streams: from its perspective, everything proceeds as if the treatment has been carried out within the same execution stream. This is advantageous in many respects. In particular, any application can be executed by the software module object of the present technique. In particular, it is not necessary to write the application in a specific way. A decomposition assist interface may be implemented later on in order to guide the decompositions. However, the developer has only to write the application as he wishes, according to his own requirements. The software module analyses the code of the application, according to specific analysis parameters and determines alone the code portions (functions, procedures, modules) to be projected in parallel execution streams. The developer has to learn any interface or to develop in a specific way.

In other words, in order to 'parallelise' a program, during loading the program, the compilation unit identifies (and/or builds) the potentially parallelisable functions and generates the necessary instrumentations so that these could be subjected to the allocation unit.

For the execution, the allocation unit relies on three functional blocks (these blocks may potentially be integrated into one single program): service, master and runner. A runner materialises the streams. The master the projectable functions placement strategy. The service supplies the code to be executed in the cluster.

In order to execute a function on a destination execution resource:

the service is in charge of the beginning and of the end of the execution of the projectable functions. For the execution, it defines a work (job) which contains the data that are necessary for the execution of the function (input parameter, execution scope, serialised object system, code of the function) in the form of a transport data structure and transmits it to the master.

the master is in charge of the placement of the different works (jobs) on the runners. It manages a wait and execution queue of the projectable (transported) functions.

a runner allows executing one or several job(s) in parallel on a resource (for example a nodejs, or a navigator, a server, a cluster, etc.).

once the function is executed, the runner performs a differentiation work, adds the output parameters and communicates to the master the end of the execution of the job (the differentiation work is performed in particular using a differentiation data structure as set out later on in connection with one embodiment).

the master removes the job from the execution queue and indicates to the service that it is completed;

the service validates the ACID properties (unless these do not apply), the order properties and updates the objects space.

A specific embodiment of the proposed technique is described later on in connection with the script language "JavaScript". Of course, this embodiment in the context of the JavaScript language is disclosed as example and it does not limits in any way the technique itself, which can be implemented in general in any script or interpretable language, such as PHP, or bytecode (java or others).

In general, according to the invention, the script code is split/modified/structured, into one or several pass(es), by the compilation unit of the software module. Once structured into projectable code portions, the allocation unit of the software module decides, on the fly, on the execution of code portions using other available resources. Thus, beforehand, it is considered that the software module is capable of obtaining or detecting one or several available resource(s), locally or remotely. The manner in which this detection is performed is not part of the object of the invention. The only important feature being that a server (for example the local resource) has knowledge of the available resources.

Based on the code split into projectable portions and on the plurality of available resources, the software module:
identifies at least one destination execution resource;
locally defines a data exchange structure, this exchange structure comprising at least one pointer list and one objects list;
serialises the exchange structure;
transmits the serialised exchange structure to the destination execution resource;
processes the results received by the destination execution resource, these results being comprised in the initial data exchange structure, retransmitted by the destination execution resource, and a differences structure, listing the modifications that have been made.

It should be noted that the previously-defined operations, in particular the operation of identifying the destination resource, may be carried out upstream, like the definition of the exchange data structure.

In other words, the technique hereinabove consists of a modification of the serialisation, which no longer consists in transmitting the serialised objects as such, but in transmitting a different data structure, derived from the objects to be transmitted, this data structure is built by the calling resource, based on the objects (and functions) to be projected, and is then, in turn, transmitted to the destination execution resource. The destination execution resource creates all of the objects based on this projected data structure and updates this projected structure (when the functions or objects modify appended values) and creates a complementary difference data structure, which lists the data that have been modified throughout the execution of the functions. Once the treatments are completed, these two data structure (the original structure and the differences structure), are sent back to the calling resource, which, based on the modifications that have been made, performs the updates of the objects (and of their data) to reflect the execution that has been completed within the destination execution resource (when some properties shall be met and are actually met, for example the ACID property, as described hereinbelow).

For example, the data structure is built by serialisation. The serialisation allows building a machine-independent data structure that can be transferred on a network protocol and after reception, carrying out an instantiation in order to rebuild the original data structure.

According to the present technique, the decomposition, identification, creation, projection and results processing treatments are implemented iteratively and/or recursively throughout the execution of the application.

5.2. Description of One Embodiment

In this embodiment, the implementation of the technical principles previously described in the JavaScript language is described. More particularly, the manner in which the execution contexts, the scope management, and the preservation of the ACID properties of the executed code are managed in the JavaScript language is described.

5.2.1. Execution Medium in Different Streams

The JavaScript engines enable the creation of isolated execution streams via interfaces available in the navigators (for example the webworkers) or in Node.js (webworkers, child.spawn/fork). The method described herein allows carrying out a function call from an execution stream A in a second execution stream B whether this is local (on the same computer) or remote (on another computer) while preserving a unified execution context. The method allows providing unified remote execution functions and opens up the field for application of the remote execution to any function and without limitation.

5.2.1.1. Correspondence of the Object Systems

Basically, in order to enable a unified execution, it is necessary to provide a solution for tracking the modifications made on the objects by the called function and to maintain the objects systems of the stream a and of the stream B in correspondence.

When a JavaScript stream A creates a stream B, the execution streams are isolated to the extent that no property or objects of A are accessible by B. The only way for A to communicate properties or objects to B is to use a communication means between A and B (IPC). Thus, the data transmitted by A are replicated in the space of B. B can use them as it sees fit as there is no link between the data of A and the data of B. Conversely, B can use an IPC to communicate properties or objects to A.

Figure 2:
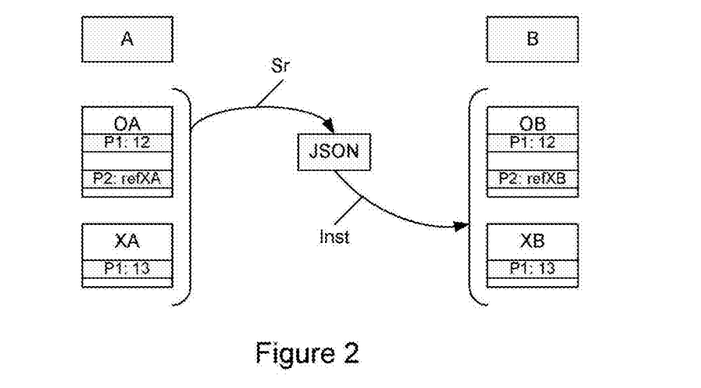
FIG. 2 describes a situation of loss of correspondence between objects for the remote execution of a script code.

In order to transmit objects, a serialisation of these is performed, and then once received by the destination execution stream, instantiation thereof is performed in this destination stream. In FIG. 2, a stream A wishes to communicate to the stream B the object Oa, containing the properties p1 (numerical 12) and p2 (a reference on an object Xa). Xa containing a property p1 (numerical 13). The serialisation (Sr) of the object Oa is performed, as well as that of Xa (for example using the call JSON.stringify(Oa)). Once received, the objects are instantiated (Inst) in Ob and Xb (for example using the call eval or JSON.parse).

It is worth noting that this way which can be used in JavaScript allows exchanging objects, but it has the major and restrictive drawback of losing the correspondence of the objects between the streams A and B. For example, the stream B does not know (has no knowledge of the fact) that Ob corresponds to Oa, and that Xb corresponds to a Xa.

Figure 3:
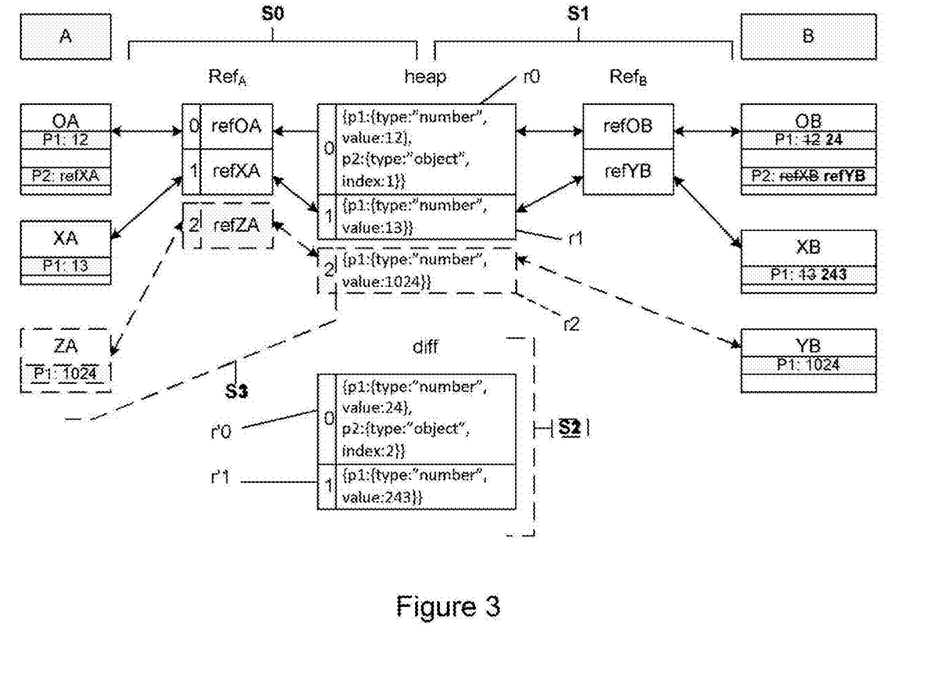
FIG. 3 describes a specific embodiment of the script code processing method.

The technique that is implemented by the inventors creates the illusion that the function that is executed in the stream B is executed in the stream A. Also, it is possible to maintain an equivalence of the objects so as to be able to update the modifications of the objects within the actual objects of the stream A. For this purpose, the inventors have defined a solution that extends the serialisation and the instantiation in order to preserve these links. This solution comprises several steps, illustrated with reference to FIG. 3. The text elements of FIG. 3 do not constitute text, but code, and therefore require no translation. In FIG. 3, the state of the objects in the execution stream A is shown (to the left side).

Step 0 (S0) consists of an extension of the serialisation:
For each object, an index (Oa→0 and Xa→1) is assigned;
A table $ref_A$ records (saves) the reference of the object (ref[0]=refOa and ref[1]=refXa)
Another table $heap_A$ records (saves) the content of each object, and if this is another object, the index of this object ($heap_A[0]$={p1:{type:"number", value:12}, p2:{type:"object", index:1}} and $heap_A[1]$={p1:{type: "number", value:13}})

Thus, $ref_A[0]$ and $heap_A[0]$ are associated to Oa and $ref_A[1]$ and $heap_A[1]$ are associated to Xa.

During the communication (serialisation) performed between A and B, only $heap_A$ is transmitted.

In the figure, the table heap is represented only once for more clarity in the presentation.

Step 1 (S1) corresponds to the step of instantiation of the objects within the stream B. On B:
$ref_B$ is emptied ($ref_B$=[ ]), then the received $heap_A$ (which therefore becomes $heap_B$ from the stream B perspective) is scrolled for all elements. For each element, a new object is instantiated and the reference is stored in the corresponding index in $ref_B$.

Thus, after instantiation, the content of the table $ref_B$ of the stream B allows making a correspondence with the content of $ref_A$ of the stream A (for example, it is known that $ref_B[1]$ on B refers to $ref_A[1]$ on A).

At this level, the stream B is capable of executing one or several function(s) present within the objects Ob or Xb. For the example described herein, these functions read and/or modify the new objects (Ob, Xb) and instantiated parameters. For example, the stream B changes Ob.p1 from the value 12 into the value 24 and associates a new object Yb to Ob.p2. Moreover, Xb.p1 is modified from the value 13 into the value 243. For this purpose, the stream B uses the heap received from A. Either A has deleted the heap on its side, or A has preserved the heap on its side, depending on the operational conditions of implementation.

Step 2 (S2) carries out a calculation of the differences (following the execution of the functions):

Once the function(s) is/are executed, it is possible to scroll the table $ref_B$ and check thanks to the $heap_B$ whether a property of the object (Ob, Xb) has changed or not. During this scrolling, a table $diff_B$ is thus created which contains the list of the differences. In the case of a change into a new object, a new index is created in $heap_B$ in order to materialise the new object. Thus, the table $diff_B$ contains for the object 0 the new value for p1 (that is to say 24) and the new index (2) of the object created in $heap_B$ for p2 (refYb). It will also contain the new value of the property p1 of Xb (namely 243).

Assuming that Ob contains another property (p3) and that its value is unchanged, it will not be described in the table $diff_B$. The table $diff_B$ does not contain the modifications on the objects (object addition, object modification (modification of a property, deletion or addition of a property).

Once the calculation of the differences and the update of $heap_B$ is completed, $diff_B$ and $heap_B$ are transmitted to the stream A (that is to say it is serialised and transmitted to the calling stream A). It is also possible to transmit only $diff_B$ and just keep $heap_A$ on the calling resource (that is to say $heap_B$ is not transmitted at the same time as $diff_B$ at the end of the execution on the stream, only $diff_B$ is transmitted: this relieves the transmissions, but puts more memory pressure on the calling resource).

Step 3 (S3) instantiation of the new objects on A:

Upon the reception of $diff_B$, A (Step 3) instantiates all of the new objects inserted in $heap_A$, and adds the references in the table $ref_A$.

The ACID property of the objects can be checked on completion of this instantiation (cf. hereinafter);

Step 4 (not represented) update of the objects on A:

The last step using the table diff, A updates the content of the objects of A.

As indicated in the diagram, all of the objects have been built between A and B and the modifications have been reported in the object space of A.

It should be noted that steps 0, 1, 2, 3 and 4 are respectively executed within the streams A, B, B, A, and A and that during these steps, nothing else can be executed within these streams.

It should also be noted that if the object Xa is accessed to by another object other than Oa, the new value of Xa has been propagated. If Xa is referenced only by Oa, then following the update, it will be collected by the garbage collector of the virtual machine.

5.2.1.2. Actual Functions Calls

Thanks to the previously-described method, the inventors have the means for maintaining the equivalences of the objects systems between two streams, which has not been possible before.

In order to carry out the function call, all of the input parameters of the function are serialised. Then, once executed, output parameters are added in the serialisation, according to the same mechanism. Thus, it is possible to call a function while maintaining the objects related to the input and output parameters.

5.2.1.3. Management of the Scopes

Figure 4:
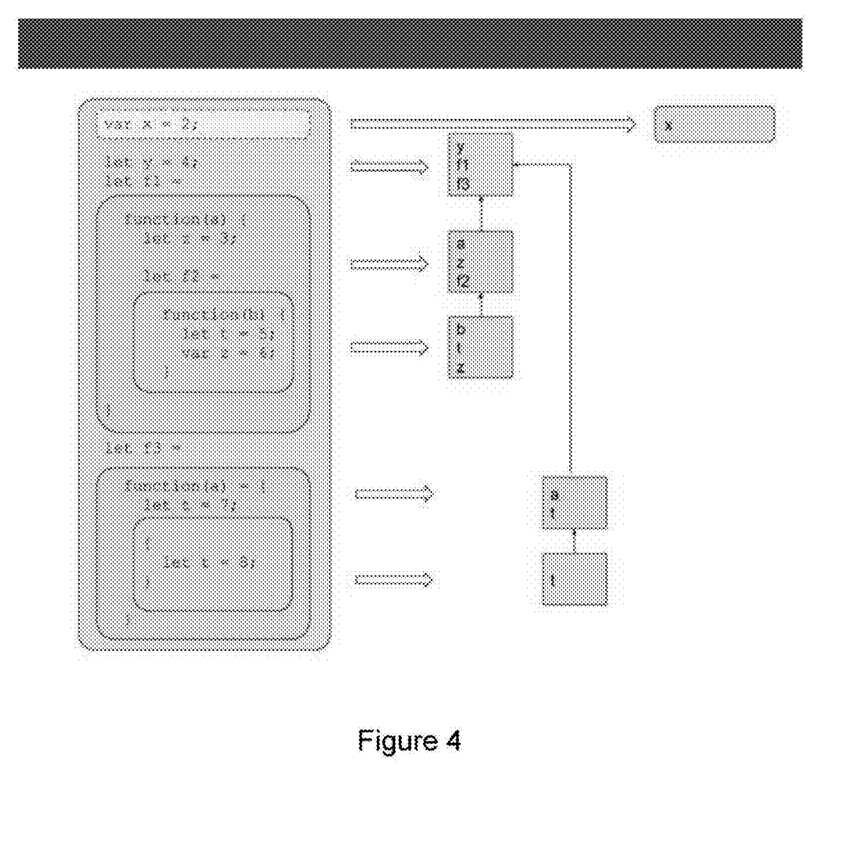
FIG. 4 illustrates the problem of scope of the variables within a script code.

Besides the parameters, a function may need to access properties/objects that are accessible in its scope, that is to say properties/objects, that although are not defined within an object to be transmitted to the destination execution resource, are nevertheless accessible in the initial script code. This is for example the case of global variables, variables or properties of a previous level or else parent objects (during objects inheritance for example). Thus, a problem to be solved in order to be able to perform a transfer towards another stream is also to be able to perform an execution context transfer, the context comprising the set of properties/objects to which the function has access during execution thereof. The determination of this context is performed upstream, that is to say before transfer towards the destination execution resource, normally by the compilation functional unit. The created context is part of the objects that are serialised and transmitted by the previously-described transmission method. FIG. 4 illustrates the scopes problem (execution scopes). It should be understood that if it is desired to transmit the execution of f2 and of f3 to a destination execution resource, the proper transmission of the execution context is essential. In particular, for example, the scope of f3 is different from the scope of f2, despite the fact that these two functions f2 and f3 define a variable named t whose scope is limited. Hence, for example, the scopes of f2 and f3 shall not collide with each other.

Thus, in order to transmit the context of the environment to a remote function call, two possibilities for processing the scopes are possible: either being in an execution phase to be able to access the environment and transmit it directly, or rewrite the script code in a particular way.

A first solution consists in simulating the JavaScript context.

In this first solution, in order to transmit the context without the assistance of the interpreter (for example without the assistance of the JavaScript engine), it is necessary to create the context in the selected language (for example in JavaScript). For this purpose, it is necessary to know all scopes of the variables, of chains of scopes and all accesses to the context. In order to do so, we shall exclude every dynamic scope, that is to say the use of keywords such as "with" and "eval", and therefore be within a purely lexical scope. The creation method comprises:

Building the scope chain associated to each scope in the program;

The separation of the program into two sets of scopes, one for the scope of the functions that will be executed remotely (remote) and the other one for the remainder of the program (resident);

Optionally, deleting, in the resident scopes, all variable links that are not used in a remote function;

Optionally, merging some scopes by renaming a conflicting link or variable name (for example, to keep only one scope per function)

Transforming the program as follows:
Once the global scope is created, creating an empty object and placing this object as a current context in the 'global' object (next, we name it 'global.curentContext') to be accessible to the entire program;

Each time a scope is created, generate an empty object, add a symbolic property 'parent' thereto which points on the context pointed by 'global.currentContext', and set this object as the current context in the object 'global' (global.currentContext);

Each time a scope is destroyed, make the 'global.currentScope' point on the object pointed by 'global.currentScope.parent'. Thus, a dynamic heap of contexts whose top is pointed at any time by 'global.currentContext' is created and updated during the execution of the program;

Each time a function 'f' is defined:
a. add a symbolic property f.context pointing on the current context pointed by 'global.currentContext' (f is the function object);
b. add in the context object pointed by 'global.currentContext' all of the parameters of the function (the name of the parameter becoming the name of a property, and its value, the value of this property);

Replace all accesses to a variable v included in a resident scope n a function f:
a. If step 4 (optional optimisation) is applied, search the name of the link corresponding to the variable v (let's call it w);
b. If step 4 is not applied, w=v;
c. Replace the access to the variable v with an access to f.context.w.

Using this first solution, consisting in rewriting the code and defining a transmission context which is associated to the different scopes, transmitting and executing a function at a destination execution resource is easy: all it needs is to transmit the function object, which contains the entire execution context of this function via its symbolic property 'context'.

A second solution consists in capturing the context and falsifying it.

In order to be able to implement this solution, we shall exclude every dynamic scope, that is to say the use of keywords "with" and "eval", and therefore be in a purely lexical scope.

1. Build the scope chain associated to each scope in the program. Mark the link with a constant attribute for the variables declared with const and mark the link with a tdz (temporal dead zone) attribute for the variables declared with const or let and which could be found in the temporal dead zone. For these, we may also set the specific time at which the link is surely not within the temporal dead zone, but we will describe this later on as an optimisation.
2. For each function, split the program into two sets of scopes, one for the scope of the functions that you wish to remotely execute (remote) and one for the remainder of the program (resident).
3. In an optimised and optional way, scroll the code of the function that we wish to remotely execute to mark each link that the function needs in the resident scope.
4. For each function that we wish to remotely execute:
   a. Add a function that captures the context in a context object with the variables derived from a link marked at step 3 (or all of the variables of the resident scope if there is no step 3).
   i. Build a contextual object, with (I) an identifier defining the configuration of the Temporal Dead Zone, (II) a list of names of variable in the Temporal Dead Zone, (III) two empty objects, one for containing the non-mutable variables (const), and another one for the mutable variables (var, let, function and class).

ii. Place one property per variable, the name of the property is the name of the variable and the location of the property depends on the type of the variable (one amongst the two objects defined in i.II: mutable or non-mutable). The value of the property is the value of the variable.

iii. In order to manage the temporal dead zone, we shall "try/catch" each access to the variables potentially in the Temporal Dead Zone in the case where these variables would actually be in the Temporal Dead Zone. In this case, we shall simply insert the name of the variable in the table of the Temporal Dead Zone (i.I). We shall also calculate an identifier that identifies the configuration of the variables of the Temporal Dead Zone by defining a bit in the identifier representing this variable.

b. Add a function that updates the context from the "context" object by writing the variables derived from a link marked at step 3 (or all of the variables of the resident scope if the is no step 3). In the case of a variable that is potentially within the Temporal Dead Zone, we shall test whether it was actually in the Temporal Dead Zone of the context object, by testing the bit id, and otherwise, update the context with the value derived from the context object.

c. Link these two new functions in the function object using properties named carefully (such as "captureContext" and "updateContext") or using a symbol.

d. It is possible to imagine the addition of a third function using the first two functions, which carries out the remote call with a specific mechanism (context capture, remote call with this context, update of the context).

5. Replace the function in the remote portion with a function that:
    a. Takes on a context object as an argument.
    b. Creates all necessary variables with their initial value contained in the context object. If the variable is in the non-mutable set, use const to declare it. If the variable is in the mutable (read/write), use let.
    c. Executes (or call) the original code in a block try.
    d. Creates all necessary variables in the Temporal Dead Zone with let.
    e. Updates the context object with the value derived from the context in the block finally corresponding to the block try. Simply ignore the variable in the temporal dead zone or in the section r (read).

A number of alternatives may be imagined using utility functions, herein also, the transformation shall be careful with regards to names conflicts with its own variables, but the transformation knows all scopes, and can therefore avoid conflicts easily.

In order to project a function with this alternative, the program shall obtain the context object from the function to be projected by calling the function pointed by the property captureUpdate of this same function. It shall then serialise this context object with the same mechanism as described before. After executing this function, the program shall update the context thanks to the context object derived from the deserialisation that it will transfer to the function pointed by the property updateContext of this same function.

5.2.1.4. Consistency of the Objects, ACID Execution of a Function, Ordered Execution In the previously-described case, a function executed in another execution stream (on a destination execution resource) modifies the objects transferred into parameters. Given the fact that this function can be executed in an asynchronous and parallel way, the execution stream A (calling resource) or another execution stream (other destination execution stream) can meanwhile modify the same objects. This is not possible in a standard JavaScript system wherein all functions are executed in the same stream. In order to maintain the consistency of the objects, the functions shall, by default, preserve the ACID (Atomicity, Consistency, Isolation and Durability) properties. Hence, the inventors have developed a technique for preserving these ACID properties. Thus, in order to execute an ACID property of the function, a differential validation is performed, which consists in particular in checking that:

the input parameters of the function and the related objects have not been modified (on A) since the beginning of execution of the function;

the scoped variables and the related objects are unchanged (on A).

For this purpose, the previously-described step 2 (S2) is reused, but applied on the stream A. If the table $diff_A$ is empty, then no modification has been made during the execution of the function, it is proceeded with the commit (the validation) of the function and the object system of the stream A is updated (steps 3 (S3) and 4). If the table $diff_A$ is not empty, then the function executed by the destination execution resource is invalidated: the updates of the parameters and objects are not propagates and the function is executed again.

Thanks to this differential validation, it is possible to execute a function, in an asynchronous and parallel way, in another stream, while maintaining its execution coherent in the initial application. Moreover, it should be noted that executing the function again in an asynchronous way does not pose any problem because the function to be executed itself is asynchronous.

Another property to be met is the asynchronous execution order relationship that is defined only by setImmediate.

For example, the following sequence:

setImmediate (f1), setImmediate (f2), setImmediate (f3)

Presupposes that f1 will be executed before f2, and that f2 will be executed before f3. Also, in the case of a remote execution, as described before, if f2 or f3 finishes before f1, it is necessary to wait for the validation (the commit) of f1 before doing the commit of f2, and then f3. In which case, the method allows identifying these cases by carrying out a specific pass especially for these aspects during the decomposition of the script source code. Moreover, during the execution, a sequencing of the validations (commits) is performed in the activation order and/or the invalidated functions are invalidated/re-executed where necessary.

Hereinbelow is a simple example showing the use of this order relationship. The order relationship is necessary in order to obtain the proper result induced by the causality of the variables of the code.

```
let result = 0;
function f(index) {
    result += (result * index) + (index * index);
}
setImmediate(f, 1), setImmediate(f, 2).
```

In this example, if the order is observed, the result amounts to 7; if the order is not met, it amounts to 9.

In the case of this example, on the one hand, the compiler (the compilation unit) can avoid dissociating the execution of these functions and, on the other hand, the allocation unit can, if it acts independently of the compilation unit, decide not to transport the execution of these functions in a destination execution resource.

Depending on the embodiments, for developers, it is possible to provide a solution for processing the decompositions that are customisable, for example via a specific programming interface (API).

From a developer perspective, it is possible to provide the means for executing a function asynchronously with or without an ACID guarantee, with or without an order guarantee. The latter calling an end handler.

It is also possible to provide the same medium by creating a promise that will allow carrying out a simple synchronisation point in the code (f(params).then( ), or the use of "await" in higher level async functions.

5.3. Other Features and Advantages

To be effective, the previously-described technique shall allow transporting the execution of a large number of functions. Thanks to the technique of the inventors, every asynchronous function is potentially projectable/deportable. These may consist of:
- event-triggered functions (for example .on('event', f), or setTimeOut or setImmediate);
- async functions;
- functions executed in webworkers.

As regards other synchronous code sequences, these are also projectable/deportable depending on their used data. For example, in a synchronous sequence, we have a following behaviour in the JavaScript code:
- FA—work on a data set A and production of A';
- FB—work on a data set B and production of B';
- FC—work on a data set C and production of C';
- Next—the code is resumed.

It is easy to understand that if A, A', B, B', C and C' are different objects/properties, then FA, FB and FC are projectable/deportable and all it needs is to create a synchronisation point before Next is executed so there is no problem on execution. Thus, work on loops whose functions work on separate objects/properties is thus projectable/deportable.

Therefore, this code

```
let samples = [...];
let out = [ ];
for (let index = 0; index < samples.length; index++) {
    out [index] = workOn(samples[index]);
}
```

May be transformed into a projectable and parallelisable sequence. Similarly, the same also applies to the function Map defined in JavaScript. let newArr=oldArr.map ((val, index, arr)=>{

```
    // return element to new Array
});
Also:
f(..) {
    Preamble...
    //
    ... work on a data set A
    //
    //
    ... work on a data set B
    //
    Next...
}
```

A code transformation allowing creating promises for example may be used. The compilation unit generates these transformations based on the ACID property and on the execution order of the function(s). For example:

```
f(..) {
    Preamble...
    async function mf( ) {
        async function dA( ) {
            // work on a data set A
        }
        async function dB( ) {
            // work on a data set B
        }
        let odA = dA( );
        let odB = dB( );
        await odA;
        await odB;
    }
    mf( ).then(function ( ) {
        // Next...
    });
}
```

1.4. Implementation Systems and Devices

Figure 5:
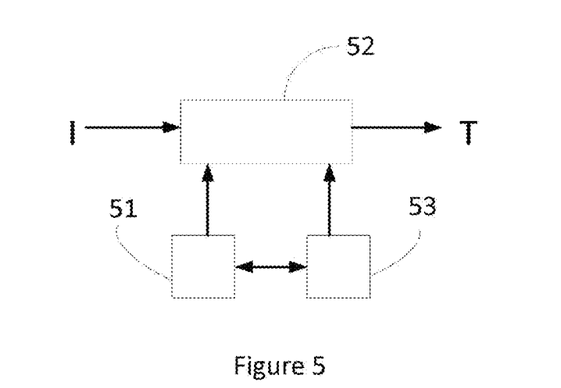
FIG. 5 illustrates an architecture of a calling resource adapted to implement a processing method of the invention.

Referring to FIG. 5, a simplified architecture of an execution electronic device adapted to perform processing and execution of a script code is presented. An execution electronic device comprises a memory 51, a processing unit 52 equipped for example with a microprocessor, and driven by the computer program 53, implementing the method as described before. In at least one embodiment, the invention is implemented in the form of an application installed on this device. Such a device comprises:
- means for obtaining the script code comprising a set of projectable objects, a projectable object of the set of projectable objects comprising at least one function that is executable at a destination execution resource;
- means for preparing a transmission data structure of at least one projectable object of said script code obtained beforehand, said transmission data structure associating at least one indexing data to each object of the script code;
- means for transmitting the transmission data structure of the script code to a destination execution resource; and
- means for receiving an execution results data structure, implemented subsequently to the execution of the transmission data structure by the destination execution resource;
- means for integrating execution results of the execution results data structure.

Figure 6:
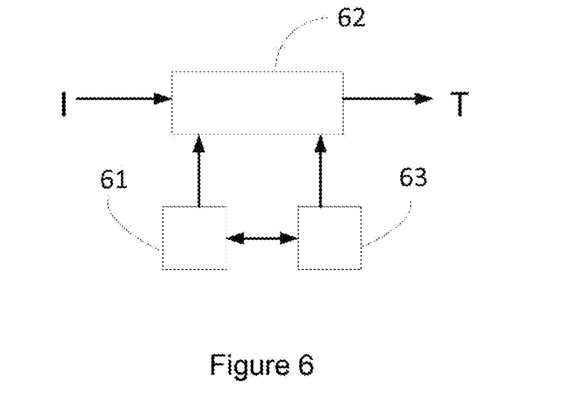
FIG. 6 illustrates an architecture of a destination execution resource adapted to implement a processing method of the invention.

Referring to FIG. 6, a simplified architecture of an execution electronic device is presented, also called destination execution resource, adapted to perform transactions using a contextual fingerprint. Such an execution electronic device comprises a memory 61, a processing unit 62 equipped for example with a microprocessor, and driven by the computer program 63, implementing the method according to the invention. In at least one embodiment, the invention is implemented in the form of an application installed on an execution electronic device accessible by a calling resource. Such an execution electronic device comprises:

means for receiving the transmission data structure of the script code; and means for executing the script code resulting from the instantiation of the received data structure in the form of projectable objects, and means for tracing the execution results of at least one function contained in these objects;

means for preparing an execution results data structure of said at least one projectable object of said script code executed beforehand, said execution results data structure associating at least one indexing data to each object of the modified script code;

means for transmitting the execution results data structure of the script code to a local execution resource.

These means are in the form of a specific software application, or else in the form of dedicated hardware components. More particularly, in at least one embodiment, these means are in the form of several hardware components to which several software components are adjoined.

The invention claimed is:

1. A method for executing a script code of an application, the method being implemented into an electronic device, called a calling resource, within which said application is executable, the method comprising:

obtaining the script code of the application comprising a set of projectable objects, at least one projectable object of the set of projectable objects comprising at least one function executable at a destination execution resource;

preparing an indexing table, for each projectable object to be transmitted to the destination execution resource comprising at least one object indexing data and preparing a transmission data structure of the at least one projectable object of said set of projectable objects obtained beforehand, said transmission data structure associating said at least one object indexing data to each projectable object of the set of projectable objects;

transmitting, to the destination execution resource, the transmission data structure of the set of projectable objects; and subsequently to execution, by the destination execution resource, of at least one function of said at least one projectable object of the set of projectable objects of the transmission data structure:

receiving an execution results data structure of execution results of said at least one function, said execution results data structure comprising said at least one projectable object indexing data; and integrating execution results of the execution results data structure within the calling resource, comprising a projectable object update according to said at least one projectable object indexing data, wherein the obtaining the script code comprises:

obtaining a script source code representative of the application to be executed by the calling resource;

determining, within the script source code, at least one function prone to be executed by the destination execution resource, called projectable function; and modifying the script source code, delivering an execution script code comprising said set of projectable objects, according to said at least one projectable function determined beforehand.

2. The method according to claim 1, wherein the integrating execution results of the execution results data structure within the calling resource comprises a differential verification of integrity of the at least one projectable object indexing data updated during the execution, by the destination execution resource.

3. The method for executing the script code according to claim 1, wherein the preparing a transmission data structure of at least one projectable object of said script code comprises:

creating the indexing table, for each projectable object to be transmitted to the destination execution resource, within which table an index is associated to an object reference; and creating the transmission data structure in a form of a table comprising, for each projectable object, an index, corresponding to the index of the reference of this projectable object within the indexing table and a serialised representation of the projectable object.

4. The method for executing the script code according to claim 1, wherein the receiving a data structure of execution results of said at least one function comprises:

receiving the transmission data structure transmitted beforehand, in a form of a table comprising, for each projectable object, an index, corresponding to the index of the reference of this projectable object within an indexing table of the destination execution resource, and a serialised representation of the projectable object; and receiving the execution results data structure in a form of a table comprising, for each projectable object of the transmission data structure transmitted beforehand, an index and a serialised representation of the modifications performed by said at least one function executed by the destination execution resource.

5. The method for executing the script code according to claim 1, wherein the integrating execution results of the execution results data structure within the calling resource comprises:

updating, within the calling resource, a list of objects, the update comprising a creation of a new object when an object absent from the transmission data structure has been created by the destination execution resource during the execution; and updating values of the objects of the objects list, comprising a verification of a consistency of the values to be updated according to original values contained in the transmission data structure.

6. The method for executing the script code according to claim 1, wherein the modifying the script source code, delivering an execution script code comprising said set of projectable objects, according to said at least one projectable function determined beforehand comprises:

determining at least one execution context of said application, according to the script source code, said execution context of said application comprising, for each variable and/or object of the script source code, a representation of a corresponding variable and/or object, accessible and/or modifiable during the projection towards the destination execution resource, said execution context taking into account a scope of each variable and/or object of the script source code; and building the script code according to the script source code and to said execution context determined beforehand.

7. An electronic device for executing a script code, called a calling resource, the device comprising:
   a processor; and
   a non-transitory computer-readable medium comprising instructions stored thereon which when executed by the processor configure the electronic device to:
   obtain the script code comprising a set of projectable objects, at least one projectable object of the set of projectable objects comprising at least one function executable at a destination execution resource;
   prepare an indexing table, for each projectable object to be transmitted to the destination execution resource comprising at least one object indexing data and prepare a transmission data structure of the at least one projectable object of said set of projectable objects obtained beforehand, said transmission data structure associating said at least one object indexing data to each object of the set of projectable objects;
   transmit to the destination execution resource, the transmission data structure of the set of projectable objects; and
   receive an execution results data structure, implemented subsequently to the execution, by the destination execution resource, of the transmission data structure, said execution results data structure comprising said at least one projectable object indexing data;
      integrate execution results of the execution results data structure, comprising a projectable object update according to said at least one projectable object indexing data,
   wherein the obtaining the script code comprises:
   obtaining a script source code representative of the application to be executed by the calling resource;
   determining, within the script source code, at least one function prone to be executed by the destination execution resource, called projectable function; and
   modifying the script source code, delivering an execution script code comprising said set of projectable objects, according to said at least one projectable function determined beforehand.

8. A non-transitory computer-readable medium comprising a computer program product stored thereon comprising program code instructions for execution of a method, for executing a script code of an application when the instructions are executed on a processor of an electronic device, called a calling resource, within which said application is executable, wherein the instructions configure the calling resource to:
   obtain the script code of the application comprising a set of projectable objects, at least one projectable object of the set of projectable objects comprising at least one function executable at a destination execution resource;
   prepare an indexing table, for each projectable object to be transmitted to the destination execution resource comprising at least one object indexing data and prepare a transmission data structure of the at least one projectable object of said set of projectable objects obtained beforehand, said transmission data structure associating said at least one object indexing data to each projectable object of the set of projectable objects;
   transmit, to the destination execution resource, the transmission data structure of the script code; and
   subsequently to execution, by the destination execution resource, of at least one function of said at least one projectable object of the set of projectable objects of the transmission data structure:
      receive an execution results data structure of execution results of said at least one function, said execution results data structure comprising said at least one projectable object indexing data; and
      integrate execution results of the execution results data structure within the calling resource, comprising a projectable object update according to said at least one projectable object indexing data,
   wherein the obtaining the script code comprises:
   obtaining a script source code representative of the application to be executed by the calling resource;
   determining, within the script source code, at least one function prone to be executed by the destination execution resource, called projectable function; and
   modifying the script source code, delivering an execution script code comprising said set of projectable objects, according to said at least one projectable function determined beforehand.

\* \* \* \* \*